United States Patent [19]

Furukawa et al.

[11] Patent Number: 5,093,290
[45] Date of Patent: Mar. 3, 1992

[54] SILICON NITRIDE TYPE SINTERED BODIES AND METHOD FOR PRODUCING THE SAME

[75] Inventors: Mitsuhiko Furukawa; Masaharu Shiroyama; Mitsuyoshi Nagano; Yasumi Takano, all of Fukuoka, Japan

[73] Assignee: Nippon Tungsten Co., Ltd., Fukuoka, Japan

[21] Appl. No.: 465,198
[22] PCT Filed: Jul. 7, 1989
[86] PCT No.: PCT/JP89/00687
 § 371 Date: Mar. 2, 1990
 § 102(e) Date: Mar. 2, 1990
[87] PCT Pub. No.: WO90/00531
 PCT Pub. Date: Jan. 25, 1990

[30] Foreign Application Priority Data

Jul. 8, 1988 [JP] Japan ................. 63-170490

[51] Int. Cl.$^5$ ............................... C04B 35/58
[52] U.S. Cl. ......................... 501/97; 501/98
[58] Field of Search ................ 501/96, 97, 98

[56] References Cited

U.S. PATENT DOCUMENTS

| | | | |
|---|---|---|---|
| 3,969,125 | 7/1976 | Komeya et al. | 106/73.2 |
| 3,991,148 | 11/1976 | Lumby et al. | 264/56 |
| 3,991,166 | 11/1976 | Jack et al. | 423/327 |
| 4,066,468 | 1/1978 | Kamigaito et al. | 501/98 |
| 4,127,416 | 10/1979 | Lumby et al. | 501/98 |
| 4,327,187 | 4/1982 | Komatsu et al. | 501/97 |
| 4,407,970 | 10/1983 | Komatsu et al. | 501/98 |
| 4,412,009 | 10/1983 | Komatsu et al. | 501/98 |
| 4,560,669 | 12/1985 | Matsuhiro et al. | 501/98 |
| 4,609,633 | 9/1986 | Kukuhara et al. | 501/98 |
| 4,777,822 | 10/1988 | Uemura et al. | 501/97 |

FOREIGN PATENT DOCUMENTS

| | | | |
|---|---|---|---|
| 139793 | 5/1985 | European Pat. Off. | 501/98 |
| 56-129667 | 10/1981 | Japan | 501/98 |
| 57-003769 | 1/1982 | Japan | 501/98 |
| 58-151371 | 9/1983 | Japan | 501/98 |

Primary Examiner—William R. Dixon, Jr.
Assistant Examiner—Anthony J. Green
Attorney, Agent, or Firm—Jordon and Hamburg

[57] ABSTRACT

The deterioration of strength at high temperature of $Si_3N_4$—$Y_2O_3$—AlN series silicon nitride-type sintered bodies is reduced by employing $Y_2O_3$—MgO—AlN series as a sintering aid wherein the stoichiometrical ratio of Y, Mg and Al in the sintered body is controlled to a specific range, thereby decreasing the glass phase to decrease deterioration of strength at high temperatures. Assuming Y as $A_1$ mol, Mg as $B_1$ mol and $A_1$ as $C_1$ mol based on one mol of $Si_3N_4$ in the sintered body, the specific range, wherein each of $A_1$, $B_1$ and $C_1$ is not less than 0, satisifies the conditions:

$$-0.03 \leq C_1 - (A_1 + B_1) \leq 0.03 \text{ mol};$$
$$0.1 \leq A_1 + B_1 + C_1 \leq 0.4 \text{ mol; and}$$
$$0.2 \leq B_1/A_1 \leq 1.2$$

and the crystal phase of $Si_3N_4$ consisting of an $\alpha$-$Si_3N_4$ phase in which a part of $Si_3N_4$ is replaced by Y, Mg, O and Al, and a $\beta$-$Si_3N_4$ phase in which a part of $Si_3N_4$ is replaced by Al and O, and a balance of a binding glass phase comprising Si, Al, O, N, Y and MG, wherein the ratio between the $\alpha$-$Si_3N_4$ phase and $\beta$-$Si_3N_4$ phase is defined as:

$$5 \leq \frac{\alpha}{\alpha + \beta} \leq 50 \text{ (vol \%)}.$$

7 Claims, 4 Drawing Sheets

RELATION BETWEEN $Al_2O_3$ ADDITION AND PHYSICAL PROPERTY

No. 4 COMPOSITION $95Si_3N_4$-$5Y_2O_3$-(1.16MgO)-(3AlN)-(1TiN) (wt. %)

No. 4 COMPOSITION  $95Si_3N_4-5Y_2O_3-(1.16MgO)-(3AlN)$

HIP SINTERING AT 1650°C AFTER PRELIMINARY SINTERING AT 1700°C

AVERAGE GRAIN SIZE OF $Si_3N_4$ STARTING POWDER (μm)

No. 4 ○ --- $95Si_3N_4$-$5Y_2O_3$-(1.16MgO)-(3AlN)-(1TiN) (INVENTED PRODUCT)

No. 3 ● --- $93Si_3N_4$-$7Y_2O_3$-(3MgO)-($2Al_2O_3$) (COMPARATIVE PRODUCT)

HIP SINTERING AT 1650°C AFTER PRELIMINARY SINTERING AT 1700°C

SILICON NITRIDE TYPE SINTERED BODIES AND METHOD FOR PRODUCING THE SAME

The present invention concerns a silicon nitride-type material with reduced deterioration of strength at high temperature suitable for super-high speed cutting tools or high temperature structural material.

BACKGROUND OF THE INVENTION

Heretofore, as $Si_3N_4$ material, those described in, for example, Japanese Patent Unexamined Publication (KOKAI) Sho 49-21091, Sho 57-95873, Sho 59-182276, etc. have been known.

As production processes for them, there are a production method for $\beta$-$Si_3N_4$ in a $Si_3N_4$-$Y_2O_3$-$Al_2O_3$ system by adding $Y_2O_3$ and $Al_2O_3$ or in a $Si_3N_4$-$Y_2O_3$-$MgO$-$Al_2O_3$ system by adding $Y_2O_3$-$MgO$-$Al_2O_3$ as a sintering aid, as well as a production method for $\alpha'$-$Si_3N_4$ and $\beta$-$Si_3N_4$ in a $Si_3N_4$-$Y_2O_3$-$AlN$ series $\alpha$-sialon or $Si_3N_4$-$Y_2O_3$-$Al_2O_3$-$AlN$ series by adding $Y_2O_3$-$AlN$.

However, a glass phase comprising Si, N and additive ingredients is present between $Si_3N_4$ particles, which bind crystal grains of $Si_3N_4$ in any of the sintered bodies.

The glass phase is softened at high temperature to reduce the strength. That is, deterioration of the strength is remarkable at a temperature higher than 800° C. and the strength is reduced to about one-half, in relation to normal temperature bending strength, at a temperature higher than 1200° C.

For preventing the strength deterioration at high temperature, a $Si_3N_4$ series material free from any glass phase, for example, a solid-solution-type $Si_3N_4$ such as $\beta$-sialon or a reaction-sintered $Si_3N_4$ compound of $Si_3N_4$ alone may be satisfactory. However, although these materials show less deterioration of strength at high temperature the strength itself is low at normal temperature and they are not suitable for structural material and tool material.

As for other means, although it is possible to prevent softening at high temperature by crystallizing the glass phase, this requires heat treatment in addition to sintering, making the steps complicated.

The principal object of the present invention is to obtain silicon nitride material having bending strength at normal temperature comparable with that of conventional silicon nitride having a glass phase but, in addition having much less deterioration of strength at high temperature.

SUMMARY OF THE INVENTION

According to the present invention, the foregoing object has been attained by using an $Y_2O_3$-$MgO$-$AlN$ system as a sintering aid and controlling the stoichiometrical ratio of Y, Mg, Al in the sintered body within a specific range.

That is, in accordance with the present invention, it is possible to obtain silicon nitride material having a bending strength at normal temperature of not less than 100 kg/mm$^2$, which is comparable with that of conventional $\beta$-$Si_3N_4$ having a glass phase, and with much less deterioration of the strength, such as deterioration of strength at high temperature of not greater than 10% at 1000° C. and 20% at 1200° C. as compared with conventional material, by controlling the mol number of Y, Mg, and Al present in the sintered body of the $Si_3N_4$-$Y_2O_3$-$MgO$-$AlN$ series.

As specific conditions in the stoichiometrical ration of Y, Mg and Al in the sintered body described above, the following three conditions are to be satisfied:

$$0.1 \leq A_1 + B_1 + C_1 \leq 0.4 \quad (1)$$

$$0.2 < B_1/A_1 < 1.2 \quad (2)$$

$$-0.03 \leq C_1 - (A_1 + B_1) \leq 0.03 \quad (3)$$

where $A_1$, $B_1$ and $C_1$ represent the atomic mol numbers of Y, Mg and Al, respectively, per one mol of $Si_3N_4$.

Stated in other terms, the stoichiometrical ratio of $Y_2O_3$, MgO and AlN in the sintered body described above must satisfy the following four conditions:

$$0.08 \leq A_2 + B_2 + C_2 \leq 0.35 \text{ (mol)} \quad (1)$$

$$-0.28 \leq B_2 - (A_2 + C_2) \leq 0.035 \text{ (mol)} \quad (2)$$

$$A_2 > 0, B_2 > 0, C_2 > 0 \text{ (mol)} \quad (3)$$

$$0.4 \leq C_2/A_2 \leq 2.4 \text{ (mol)} \quad (4)$$

wherein $A_2$, $B_2$ and $C_2$ represent the molecular mol numbers of $Y_2O_3$, AlN and MgO, respectively, per one mol of $Si_3N_4$.

In the silicon nitride-type sintered body according to the present invention, the strength of the sintered body can be further improved by admixing and dispersing fine particles of titanium carbide, nitride and/or carbonitride in an amount of 0.5 to 5 weight %, based on the total weight of the sintered body. Since they cause no reactions such as solid solution reactions with $Si_3N_4$ or sintering aids, they function as a dispersing improver, by which toughness is improved. The particle size is, desirably, less than 1 $\mu$m.

In a production process according to the present invention, while a sintered body excellent in high temperature strength and easy sinterability can be obtained by a specific composition range, there are several conditions also needed in production. They are use of an organic solvent as a solvent upon mixing pulverization and use of a starting powder containing not less than 90% by volume of $\alpha$-$Si_3N_4$ and having a grain size of less than 1 $\mu$m.

According to the present invention, it is possible to obtain a silicon nitride sintered body having a bending strength at normal temperature comparable with that of conventional silicon nitride having a glass phase but less deterioration in the strength at high temperature. The sintered body may be obtained by sintering the powder blend composition, for example, by hot press sintering, press sintering in a nitrogen gas atmosphere, ambient pressure sintering, or hot isostatic pressing in nitrogen gas.

BRIEF DESCRIPTION OF THE DRAWINGS

FIG. 1 is a diagram showing the effect on bending strength at room temperature, of the molar ratio for each of Y, Mg and Al defined as: Y=$A_1$, Mg=$B_1$ and Al=$C_1$ in a $Si_3N_4$-$Y_2O_3$-$MgO$-$AlN$ sintered body subjected to HIP processing at 1650° C. after preliminary sintering in $N_2$ gas at 1700° C. The ordinate indicates the bending strength (kg/mm$^2$) at room temperature.

As shown in FIG. 1, it can be seen that the bending strength at room temperature is high within a range of $CF_{1-(A1+B1)}$ of not less than $-0.03$ mol and not greater than 0.03 mol. That is, the sinterability is improved within the range, thus making ordinary sintering possible and increasing the strength at room temperature. Conversely, if it exceeds 0.03 mol, the sinterability is remarkably reduced making it impossible to use ordinary sintering, whereby sintering is possible only by hot pressing. Further, if it is less than $-0.03$ mol, although the sinterability is preferred, the strength at room temperature is low to deteriorate the characteristics of high strength, which is the merit of the $Si_3N_4$ series, and it is not suitable as structural material.

Within the range of the present invention, it is considered, in terms of the behavior of Y, Mg and Al in the sintered body, that a $\beta$-$Si_3N_4$ phase is formed in $Si_3N_4 + Y_2O_3 + MgO + $ (Al in AlN) and an $\alpha$-$Si_3N_4$ phase is formed in $Si_3N_4 + Y_2O_3 + MgO + AlN$, in which the respective sintering aids are partially solid-solubilized and partially form a glass phase.

In the course of the formation, if MgO is superfluous ($B_1/A_1 > 1.2$), an $\alpha$-$Si_3N_4$ phase in which Mg is excessively solid-solubilized is formed, which reduces the strength since this phase comprises granular crystals and not acicular crystals of $\beta$-$Si_3N_4$ phase with high strength. Conversely, if MgO is insufficient ($B_1/A_1 > 0.2$) sinterability is lowered. Accordingly, the range should be $1.2 \geq B_1/A_1 \geq 0.2$.

Further, the total amount of the sintering aids is preferably from 0.1 to 0.4 mol based on one mol of $Si_3N_4$. The sinterability is poor if it is less than 0.1 mol. On the other hand, sufficient strength cannot be obtained in mechanical properties, in particular, bending strength, due to an increase in the bound glass phase at the crystal grain boundary if it exceeds 0.4 mol.

In the region of the composition as described above the state of the crystal phase as expressed by the ratio by volume of the $\alpha$-$Si_3N_4$ phase and $\beta$-$Si_3N_4$ phase is:

$$0.05 < \frac{\alpha}{\alpha + \beta} < 0.5$$

In the present invention, the addition amount $Al_2O_3$ often used as a sintering aid is preferably zero.

Figure 1:
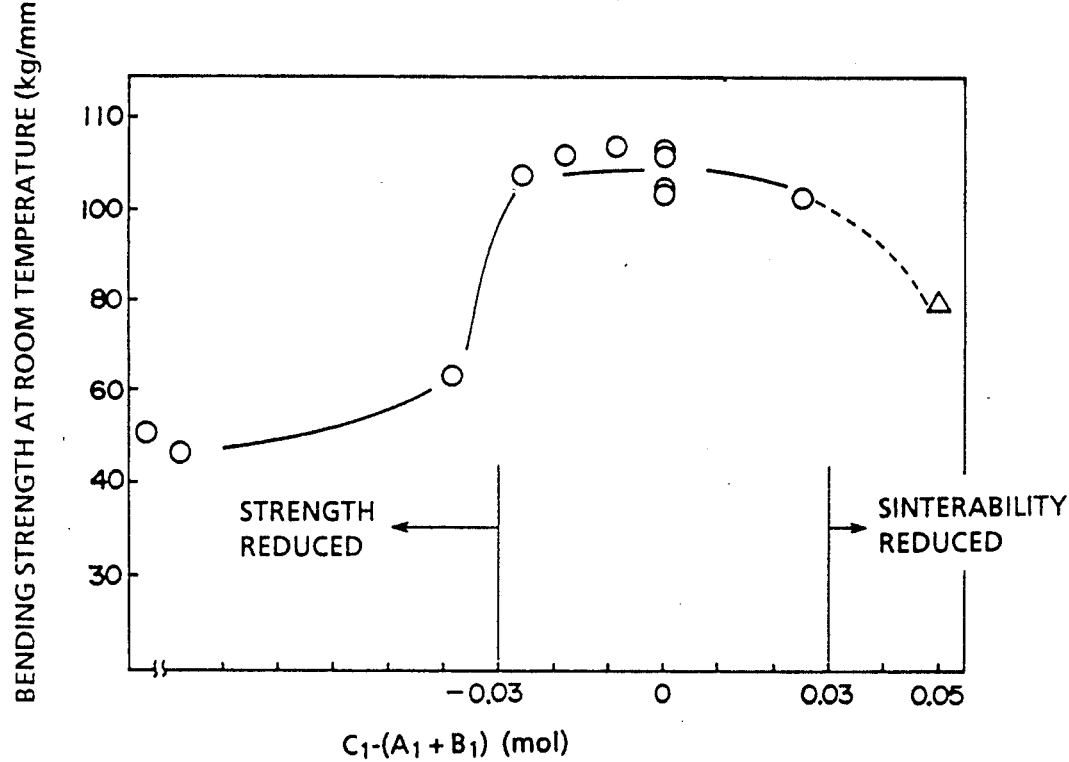
FIGS. 1-4 are graph diagrams illustrating characteristics of the sintered body according to the present invention.
Figure 2:
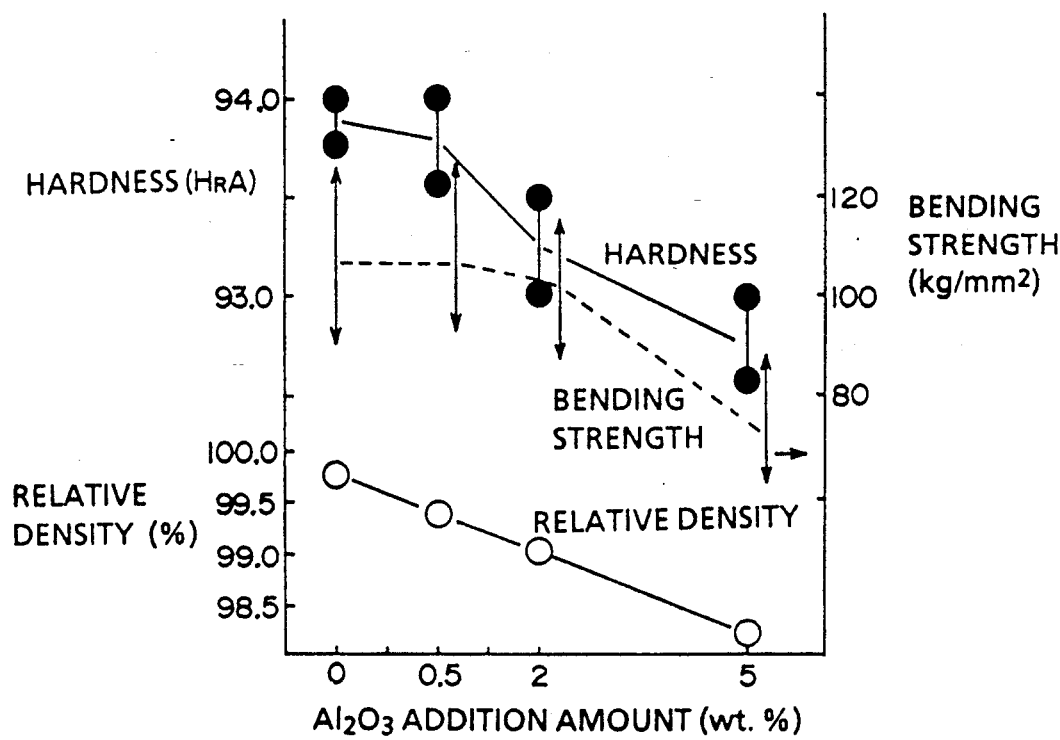

FIG. 2 shows the effect on the mechanical property in a case where $Al_2O_3$ is added to $95Si_3N_4$-$5Y_2O_3$-$(1.16MgO)$-$(3AlN)$-$(1TiN)$ (here and hereinafter based on weight % wherein the value in each of the blanks shows an external ratio). In this experiment, $Si_3N_4$-$Y_2O_3$ is assumed as 100 and other additives are added in proportion to the external ratio. As can be seen from FIG. 2, the relative density is decreased and the bending strength is reduced with an increase in the addition amount.

That is, the presence of $Al_2O_3$ is not preferred in the present composition. It is considered that $Al_2O_3$ forms $\beta$-$Si_3N_4$ while forming a glass phase with $Si_3N_4$, $Y_2O_3$, MgO, etc. proceeding to AlN. As a result, the $\alpha$ ratio and relative density ar lowered to reduce the hardness and the strength.

Further, strength of the sintered body can be improved by adding and blending particles of titanium carbide, nitride and carbonitride. Since they cause no reactions such as solid solution reactions with $Si_3N_4$ or sintering aids, they function as a dispersion improver thereby improving the toughness. Their grain size is preferably not greater than 1 $\mu$m.

If the grain size is not greater than 1 $\mu$m it results in suppressing the grain growth of $Si_3N_4$ and contributes to an improvement of the strength and hardness as a dispersion improver. However, if the grain size exceeds 1 $\mu$m, the function as a dispersing improver is reduced to provide only poor improvement in the strength and the hardness.

Figure 3:
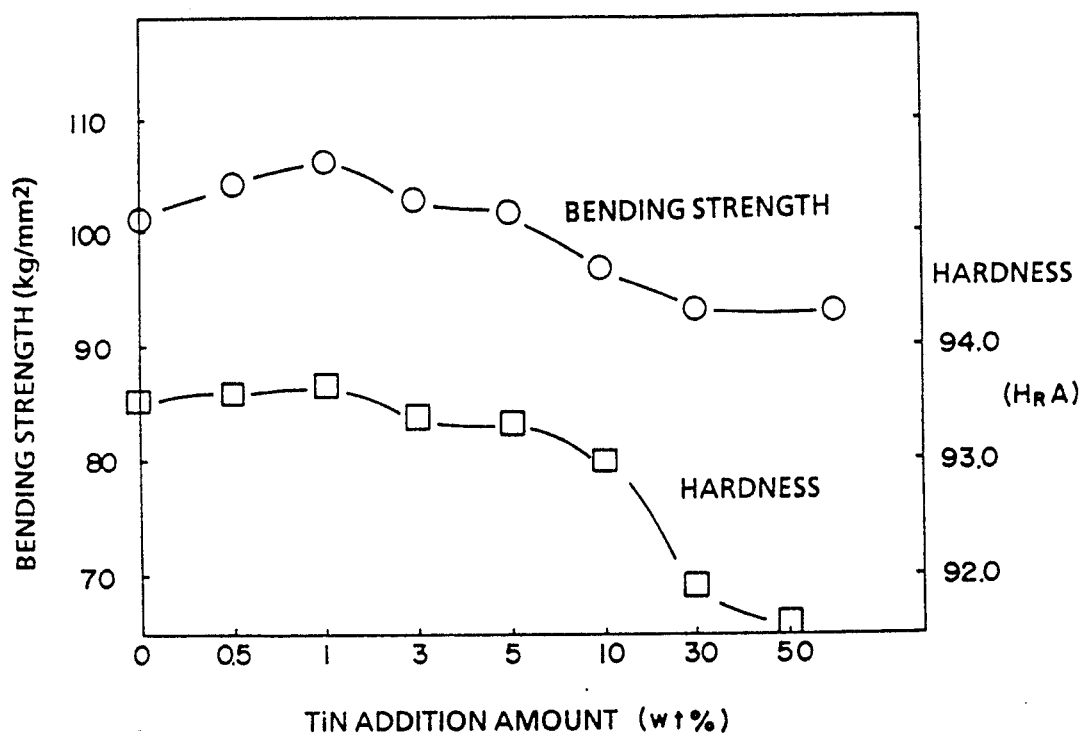

FIG. 3 shows the effect of the addition amount in a case where TiN is added, as a dispersant, to $95Si_3N_4$-$5Y_2O_3$-$(1.16MgO)$-$(3AlN)$ as a base. As shown in FIG. 3, the bending strength is improved if the addition amount is from 0.5 to 5 % by weight.

The composition of the present invention contains AlN, which reacts with water to form ammonia and, at the same time, is partially oxidized to form Al-oxide. That is, if the composition is mixed with an aqueous solvent, the AlN addition effect is eliminated to give the same effect as the addition of $Al_2O_3$. Accordingly, a suitable solvent is an organic solvent, preferably methanol or ethanol, for preventing oxidation of AlN.

Referring to the grain size of the starting powder, there is a certain relationship between the strength and the starting powder in the composition according to the present invention. A smaller grain size is preferred for all of $Si_3N_4$, $Y_2O_3$, MgO and AlN. In particular, the average grain size of $Si_3N_4$ and $Y_2O_3$ is not greater than 1 $\mu$m and the grain size of $Si_3N_4$ is, preferably, not greater than 0.5 $\mu$m, because the dispersibility of the powdery particles, solid solubilization and formation of the glass phase are considered to be promoted when the grain size is smaller.

Figure 4:
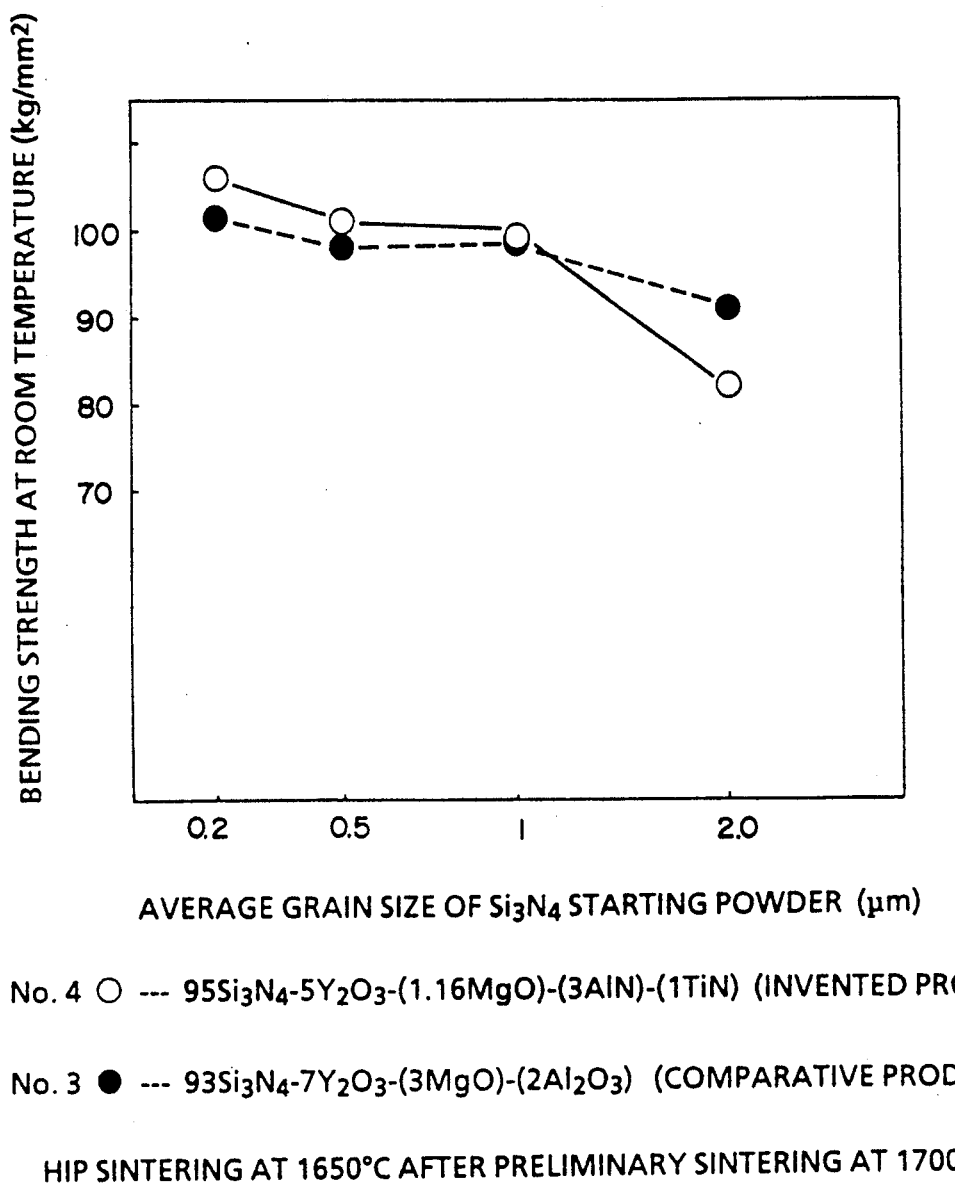

FIG. 4 shows the dependency of the bending strength on the grain size of $Si_3N_4$ As can be seen from FIG. 4, the effect on the bending strength due to the difference of the average grain size of the $Si_3N_4$ starting powder is not remarkable for No. 3 in relation to $\beta$-$Si_3N_4$, but the bending strength is abruptly reduced if the average grain size exceeds 1 $\mu$m for No. 4, which is a product according to the present invention. Accordingly, within the composition range of the present invention, the average grain size of the $Si_3N_4$ starting powder has to be not greater than 1 $\mu$m, and, preferably, not greater than 0.5 $\mu$m.

DESCRIPTION OF THE PREFERRED EMBODIMENTS

A predetermined amount of $Y_2O_3$-MgO-AlN was added to an $\alpha$-$Si_3N_4$ powder with an average grain size of 0.2 $\mu$m, to which TiN or TiC powder with an average particle size of 0.4 $\mu$m was further added and they were charged together with $ZrO_2$ balls into a rubber-lined pot and pulverized and mixed for 40 hours using methanol as a solvent.

Then, the resultant slurry was spray dried with the addition of an organic binder by a closed type spray drier. The resultant pelletized powder was press molded into $10 \times 50 \times 5$ mm, removed with the binder and then maintained at 1 atm. in $N_2$ gas at a sintering temperature of 1650°–1750° C. for 2 hours to obtain a sintered body having a theoretical density of not less than 95%.

The product was further treated by hot isostatic pressing (HIP) under $N_2$ gas at 1600° C.–1500 atm. and evaluated for various physical properties and characteristics. Hot press sintering was applied to those samples not suitable for conventional sintering under conditions of a temperature of $1720 \pm 20°$ C., a pressure of 200 kg/cm$^2$ and a time of 100 min in $N_2$ gas.

In the same way, a cut tip of a shape according to JIS SNGN432 was prepared and used for a cutting test.

The compositions of the test specimens and the results of the tests are shown below in Tables 1 to 4.

As can be seen from the tables, remarkable improvement was recognized in the high temperature characteristics of the sintering material according to the present invention as compared with convention materials of the $Si_3N_4$-$Y_2O_3$-$Al_2O_3$ series, $Si_3N_4$-MgO-$Al_2O_3$ series, or $\beta$-sialon series.

Comparative Sample Nos. 17-20 have a crystal phase ratio in the sintered body of:

and have rather improved strength.

However, as a result of measuring the high temperature strength of those samples not suitable for normal pressure sintering and sintered by hot pressing, although the strength at high temperature was excellent as compared with the $Si_3N_4$-$Y_2O_3$-$Al_2O_3$ series or $Si_3N_4$-MgO-$Al_2O_3$ series, sintering was impossible using normal pressure sintering and sintering was achieved by hot pressing. It can also be seen from the above that the smaller addition amount of $Al_2O_3$ is preferred.

The examples show addition of 1% by weight of TiN, but it has also been found that the strength can be improved similarly by the use of TiC.

TABLE 1

|  |  |  |  | Comparative product | | | Invented product | | |
|---|---|---|---|---|---|---|---|---|---|
|  |  |  | No. | 1 | 2 | 3 | 4 | 5 | 6 |
| Composition | Balance wt (%) |  | $Si_3N_4$ | 95 | 100 | 93 | 95 | 93 | 93 |
|  |  |  | $Y_2O_3$ | 5 |  | 7 | 5 | 7 | 7 |
|  |  | External ratio | MgO |  | 5 | 3 | 1.16 | 1.16 | 1.62 |
|  |  |  | AlN |  |  |  | 3 | 3.73 | 4.20 |
|  |  |  | $Al_2O_3$ | 2 | 2 | 2 |  |  |  |
|  |  |  | TiN |  |  |  | 1 | 1 | 1 |
|  | mol |  | $C_1 - (A_1 + B_1)$ |  |  |  | 0 | 0 | 0 |
|  |  |  | $A_1 + B_1 + C_1$ |  |  |  | 0.22 | 0.27 | 0.30 |
|  |  |  | $B_1/A_1$ |  |  |  | 0.66 | 0.47 | 0.66 |
| Relative density |  |  |  | (98.6) | 99.0 | 99.0 | 99.5 | 99.4 | 99.6 |
| $\alpha$ ratio [$\alpha/(\alpha + \beta)$] |  |  |  | 0 | 0 | 0 | 26.7 | 39.8 | 45.9 |
| Hardness $H_RA$ |  |  |  |  |  |  | 93.5 | 93.8 | 94.0 |
| Bending Strength (kg/mm$^2$) |  |  | Room Temperature | (98) | 82 | 103 | 106 | 105 | 102 |
|  |  |  | 1000° C. | (55) | 59 | 68 | 97 | 98 | 97 |
|  |  |  | 1200° C. | (43) | 47 | 52 | 82 | 83 | 85 |
|  |  |  | Wear *1 Resistance | ○ | △ | ○ | ⊚ | ⊚ | ⊚ |
|  |  |  | Chipping *2 Resistance | ⊚ | ○ | ⊚ | ⊚ | ⊚ | ⊚ |

*1 Wear resistance FC-25 cutting
Circumferential speed V: 600 m/min, Feed: 0.25 mm/rev. Recess: 1.5 mm
Cutting time to 0.5 mm of flank wear
⊚: more than 30 min, ○: 20-30 min, △: less than 20 min.
*2 Chipping-resistance FCD-60
Circumferential speed V: 250 m/min, Recess d: 1.5 mm    Feed up to evaluated chipping
⊚: more than 0.8 mm/rev. ○: 0.5-0.7 mm/rev.
Values in the blanks are for hot press sintering product: Normal pressure sintering impossible $\frac{\alpha}{\alpha + \beta}$ within a range: $0.05 \leq \frac{\alpha}{\alpha + \beta} \leq 0.5$

TABLE 2

|  |  |  |  | Invented product | | | | |
|---|---|---|---|---|---|---|---|---|
|  |  |  | No. | 7 | 8 | 9 | 10 | 11 |
| Composition | Balance wt (%) |  | $Si_3N_4$ | 95 | 95 | 95 | 95 | 96 |
|  |  |  | $Y_2O_3$ | 5 | 5 | 5 | 5 | 4 |
|  |  | External ratio | MgO | 1.8 | 1.6 | 1.4 | 0.7 | 0.93 |
|  |  |  | AlN | 3 | 3 | 3 | 3 | 2.4 |
|  |  |  | $Al_2O_3$ |  |  |  |  |  |
|  |  |  | TiN | 1 | 1 | 1 | 1 | 1 |
|  | mol |  | $C_1 - (A_1 + B_1)$ | −0.024 | −0.017 | −0.009 | 0.017 | 0 |
|  |  |  | $A_1 + B_1 + C_1$ | 0.24 | 0.23 | 0.22 | 0.20 | 0.17 |
|  |  |  | $B_1/A_1$ | 1.01 | 0.90 | 0.79 | 0.40 | 0.66 |
| Relative density |  |  |  | 99.5 | 99.5 | 99.6 | 99.5 | 99.6 |
| $\alpha$ ratio [$\alpha/(\alpha + \beta)$] |  |  |  | 30.8 | 31.6 | 28.6 | 23.2 | 26.1 |
| Hardness $H_RA$ |  |  |  | 93.6 | 93.9 | 93.5 | 93.4 | 93.6 |
| Bending Strength (kg/mm$^2$) |  |  | Room Temperature | 107 | 106 | 107 | 102 | 102 |
|  |  |  | 1000° C. | 103 | 99 | 95 | 97 | 96 |
|  |  |  | 1200° C. | 92 | 89 | 88 | 82.5 | 81 |
|  |  |  | Wear *1 Resistance | ⊚ | ⊚ | ⊚ | ⊚ | ⊚ |
|  |  |  | Chipping *2 | ⊚ | ⊚ | ⊚ | ⊚ | ⊚ |

TABLE 2-continued

| | Invented product | | | | |
|---|---|---|---|---|---|
| No. | 7 | 8 | 9 | 10 | 11 |
| Resistance | | | | | |

*1 Wear resistance FC-25 cutting
Circumferential speed V: 600 m/min, Feed: 0.25 mm/rev. Recess: 1.5 mm
Cutting time to 0.5 mm of flank wear
⊙: more than 30 min, ○: 20-30 min, △: less than 20 min.
*2 Chipping-resistance FCD-60
Circumferential speed V: 250 m/min, Recess d: 1.5 mm   Feed up to evaluated chipping
⊙: more than 0.8 mm/rev. ○: 0.5-0.7 mm/rev.
Values in the blanks are for hot press sintering product: Normal pressure sintering impossible

TABLE 3

| | | | Out of the range | | | | |
|---|---|---|---|---|---|---|---|
| | | No. | 12 | 13 | 14 | 15 | 16 |
| Composition | Balance | $Si_3N_4$ | 97 | 95 | 95 | 98 | 95 |
| | wt (%) | $Y_2O_3$ | 3 | 5 | 5 | 2 | 5 |
| | Exter- | MgO | 0.5 | 5 | 0.3 | 5 | 2 |
| | nal | AlN | 1 | 3 | 3 | 3 | 3 |
| | ratio | $Al_2O_3$ | | | | | |
| | | TiN | 1 | 1 | 1 | 1 | 1 |
| | mol | $C_1 - (A_1 + B_1)$ | −0.021 | −0.142 | −0.032 | −0.099 | −0.031 |
| | | $A_1 + B_1 + C_1$ | 0.09 | 0.36 | 0.18 | 0.31 | 0.25 |
| | | $B_1/A_1$ | 0.47 | 2.83 | 0.17 | 7.06 | 1.13 |
| Relative density | | | (99.7) | 99.7 | (99.5) | 99.7 | 99.5 |
| α ratio [α/(α + β)] | | | (12.0) | 87.2 | (31.5) | 92.8 | 50.2 |
| Hardness $H_RA$ | | | (92.9) | 94.6 | (93.8) | 94.5 | 93.5 |
| Bending | Room | | (98) | 52 | (101) | 49 | 63 |
| Strength | Temperature | | | | | | |
| ($kg/mm^2$) | 1000° C. | | | | | | 52 |
| | 1200° C. | | | | | | 42 |
| | Wear *1 | | ○ | ○ | ⊙ | ○ | ○ |
| | Resistance | | | | | | |
| | Chipping *2 | | ⊙ | ○ | ⊙ | ○ | ⊙ |
| | Resistance | | | | | | |

*1 Wear resistance FC-25 cutting
Circumferential speed V: 600 m/min, Feed: 0.25 mm/rev. Recess: 1.5 mm
Cutting time to 0.5 mm of flank wear
⊙: more than 30 min, ○: 20-30 min, △: less than 20 min.
*2 Chipping-resistance FCD-60
Circumferential speed V: 250 m/min, Recess d: 1.5 mm   Feed up to evaluated chipping
⊙: more than 0.8 mm/rev. ○: 0.5-0.7 mm/rev.
Values in the blanks are for hot press sintering product: Normal pressure sintering impossible

TABLE 4

| | | | Comparative product | | |
|---|---|---|---|---|---|
| | | No. | 17 | 18 | 19 |
| Com- | Balance | $Si_3N_4$ | 95 | 95 | 95 |
| posi- | wt (%) | $Y_2O_3$ | 5 | 5 | 5 |
| tion | Exter- | MgO | 1.16 | 1.16 | 1.16 |
| | nal | AlN | 3 | 3 | 3 |
| | ratio | $Al_2O_3$ | 0.5 | 2 | 5 |
| | | TiN | 1 | 1 | 1 |
| | mol | $C_1 - (A_1 + B_1)$ | | | |
| | | $A_1 + B_1 + C_1$ | | | |
| | | $B_1/A_1$ | | | |
| Relative density | | | 99.3 | 99.2 | 98.2 |
| α ratio [α/(α + β)] | | | 24.5 | 12.8 | 7.2 |
| Hardness $H_RA$ | | | 93.2 | 93.1 | 92.8 |
| Bending | Room | | 104 | 92 | 87 |
| Strength | Temperature | | | | |
| ($kg/mm^2$) | 1000° C. | | 83 | 72 | 65 |
| | 1200° C. | | 75 | 63 | 51 |
| | Wear *1 | | ○ | ○ | ○ |
| | Resistance | | | | |
| | Chipping *2 | | ⊙ | ⊙ | ⊙ |
| | Resistance | | | | |

*1 Wear resistance FC-25 cutting
Circumferential speed V: 600 m/min, Feed: 0.25 mm/rev. Recess: 1.5 mm
Cutting time to 0.5 mm of flank wear
⊙: more than 30 min, ○: 20-30 min, △: less than 20 min.
*2 Chipping-resistance FCD-60
Circumferential speed V: 250 m/min, Recess d: 1.5 mm   Feed up to evaluated chipping
⊙: more than 0.8 mm/rev. ○: 0.5-0.7 mm/rev.
Values in the blanks are for hot press sintering product: Normal pressure sintering impossible Since the silicon nitride-type sintered body according to the present invention has a bending strength at normal temperature comparable with that of conventional silicon nitride having a glass phase but shows much less deterioration of strength at high temperature, it is excellent when compared with conventional $Si_3N_4$-type tools in terms of wear resistance and chipping resistance for tools suitable to high speed cutting at high tip temperature and can be applied generally as a high temperature structural material.

We claim:

1. A silicon nitride-type sintered body produced from $Si_3N_4$, $Y_2O_3$, MgO and AlN powder, wherein Y, Mg and Al are present in amounts greater than 0 satisfying the following conditions:

$$-0.03 \text{ mol} \leq Al - (Y + Mg) \leq 0.03 \text{ mol},$$
$$0.1 \text{ mol} \leq Y + Mg + Al \leq 0.4 \text{ mol and}$$
$$0.2 \leq Mg/Y \leq 1.2,$$

said sintered body having a microstructure consisting of a crystalline phase of $Si_3N_4$ and a glassy binder phase,
said crystalline phase of $Si_3N_4$ consisting of α-$Si_3N_4$ partially-substituted with Y, Mg, O and Al and β-$Si_3N_4$ partially-substituted with Al and O, said Al being substantially provided from said AlN powder, said glassy binder phase consisting of Si, Al, O, N, Y and Mg, said $\alpha$-Si$_3$N$_4$ and $\beta$-Si$_3$N$_4$ having a volume ratio in the range of $$5 \text{ vol. \%} \leq \frac{\alpha\text{-Si}_3\text{N}_4}{\alpha\text{-Si}_3\text{N}_4 + \beta\text{-Si}_3\text{N}_4} \leq 50 \text{ vol. \%}.$$

2. A silicon nitride-type sintered body produced from Si$_3$N$_4$, Y$_2$O$_3$, Mgo and AlN powder as in claim 1 further having dispersed therein a Ti component selected from the group consisting of Ti carbide, Ti nitride, Ti carbonitride and mixtures thereof, said Ti component comprising particles having an average particle size not greater than 1 $\mu$m and being present in an amount from 0.5 to 5 wt. % based on the total weight of the sintered body.

3. A silicon nitride-type sintered body according to claim 1, wherein said Si$_3$N$_4$ powder contains not less than 90% by volume of $\alpha$-Si$_3$N$_4$.

4. A silicon nitride-type sintered body according to claim 1, wherein said Si$_3$N$_4$ powder has an average grain size of not greater than 1 $\mu$m.

5. A process for producing a silicon nitride-type sintered body, comprising steps of:
 providing a Si$_3$N$_4$ phase and having an average grain size of not greater than 1.0 $\mu$m;
 adding Y mol of Y$_2$O$_3$ powder per one mol of Si$_3$N$_4$, Al mol of AlN powder per one mol of Si$_3$N$_4$, and Mg mol of MgO powder per one mol of Si$_3$N$_4$ to said Si$_3$N$_4$ powder to provide a powder blend composition satisfying the following conditions:

$-0.03 \leq \text{Al} - (\text{Y} + \text{Mg}) \leq 0.03$ mol, $0.1 \leq \text{Y} + \text{Al} + \text{Mg} \leq 0.4$ mol, and $0.2 \leq \text{Mg/Y} \leq 1.2$;

pulverizing and mixing said powder blend composition in an organic solvent to produce a slurry;
 drying said slurry to form a dried powder; and
 sintering said dried powder.

6. A process according to claim 5, wherein said sintering is selected from the group consisting of hot press sintering, press sintering in a nitrogen gas atmosphere, normal pressure sintering and hot isostatic pressing in nitrogen gas.

7. A process according to claim 5, further comprising adding to said powder blend composition, prior to pulverizing and mixing, a Ti component selected from the group consisting of Ti carbide, Ti nitride, Ti carbonitride and mixtures thereof, said Ti component comprising particles having an average particle size not greater than 1 $\mu$m and being present in an amount of from 0.5 to 5 weight % based on the total weight of the sintered body.

* * * * *